United States Patent
Colby et al.

[11] Patent Number: 5,880,415
[45] Date of Patent: Mar. 9, 1999

[54] AUTOMATIC CALIBRATION OF CURRENT REGULATOR CONTROL COMPENSATION FOR AN ELEVATOR MOTOR DRIVE WITH LOCKED ROTOR

[75] Inventors: Roy Stephen Colby, Raleigh, N.C.; Alberto Vecchiotti, Middletown; Leslie M. Lamontagne, Prospect, both of Conn.

[73] Assignee: Otis Elevator Company, Farmington, Conn.

[21] Appl. No.: 996,234

[22] Filed: Dec. 22, 1997

[51] Int. Cl.[6] .............................. B66B 1/28; G05B 11/36; G05B 13/02

[52] U.S. Cl. ...................... 187/393; 187/296; 318/609; 364/161

[58] Field of Search ...................................... 187/393, 391, 187/296, 289; 310/609, 610, 798–815; 364/160, 161, 162, 163, 164, 165

[56] References Cited

U.S. PATENT DOCUMENTS

| | | | |
|---|---|---|---|
| 5,223,778 | 6/1993 | Svarovsky et al. | 318/610 |
| 5,476,158 | 12/1995 | Mann et al. | 187/289 |

OTHER PUBLICATIONS

M. Depenbrock and N.R. Klaes, *Determination of the Induction Machine Parameters and their Dependencies on Saturation*, Ruhr–University Bochum, Germany, pp. 17–22. (1989).

N.R. Klaes, *Parameter Identification of an Induction Machine with Regard to Dependencies on Saturation*, IEEE Transactions on Industry Application, vol. 29, No. 6, Nov. 1993.

A.M. Khambadkone and J. Holtz, *Vector–Controlled Induction Motor Drive with a Self–Commissioning Scheme*, IEEE Transactions on Industrial Electronics, vol. 38, No. 5, Oct. 1991.

J. Holtz and T. Thimm, Identification of the Machine Parameters in a Vector–Controlled Induction Motor Drive, IEEE Transactions on Industry Applications, vol. 27, No. 6 Nov./Dec. 1991.

T. Rowan, R. Kerkman and D. Leggate, A Simple On–Line Adaption for Indirect Field Orientation of an Induction Machine, IEEE Transactions on Industry Applications, vol. 27, No. 4 Jul./Aug. 1991.

R. Kerkman, J. Thunes, T. Rowan and D. Schlegel, A Frequency–Based Determination of Transient Inductance and Rotor Resistance for Field Commissioning Purposes, IEEE Transactions on Industry Applications, vol. 32. No. 3, May/Jun. 1996.

H. Schierling, Self–Commissioning—A Novel Feature of Modern Inverter–Fed Induction Motor Drives, pp. 287–290.

M. Sumner and G. Asher, Autocommissioning for voltage–referenced voltage–fed vector–controlled induction motor drives, IEEE Proceedings, vol. 140, No. 3, May 1993.

Kudor et al, Self–Commissioning for Vector Controller Inductor Motors, IEEE 1993, pp. 528–535.

(List continued on next page.)

*Primary Examiner*—Robert E. Nappi

[57] ABSTRACT

An elevator controller 7 is provided with logic 48 which automatically calculates a proportional gain ($K_P$), an integral gain ($K_I$), and an overall gain (Gc) for a current regulator/motor drive 20 by injecting a sinewave having a predetermined test frequency ($F_{OL}$, $F_{CL}$) into a reference current $I_{qREF}$, measuring the open and closed loop transfer functions and adjusting $K_P$ and $K_I$ until the desired open and closed loop responses are achieved with Gc set based on $F_{OL}$. First, with the test frequency at $F_{OL}$, $K_I$ is set to zero and $K_P$ is varied until the open loop gain response at $F_{OL}$ is equal to one. Then, with the test frequency at $F_{CL}$ and $K_P$ set per the previous step, $K_I$ is varied until the closed loop gain response at $F_{CL}$ is equal to one. The procedure is performed with the rotor locked.

10 Claims, 5 Drawing Sheets

OTHER PUBLICATIONS

Tungpimolrut et al, A Direct Measuring Method of Machine Parameters for Vector–Controlled Induction Motor Drives, 1993 IEEE pp. 997–1002.

Green et al, Measurement and On–line Estimation Approaches to a Parameter Variation in Vector Controllers, IEEE Colloq. 1993. pp. 3/1–3/5.

Wade et al, Parameter Identification for Vector Controlled Induction Machines, Heriot–Wat University, UK, pp. 1187–1192.

Bunte et al, Parameter Identification of an Inverter–fed Invention Motor at Standstill with a Correlation Method, Universal Paderborn—Germany, The European Power Electornics Association 1993, pp. 97–102.

Wang et al, An Automated rotor time Constant Measurement System for Indirect Field–Oriented Drives, IEEE Transaction on Industry Applications, vol. 24, No. 1, Jan./Feb. 1988.

Lorenz, Tuning of Field–Oriented Induction Motor Controllers for High–Performance Applications, IEEE Transactions on Industry Applications, vol. 1A–22, No. 2, Mar./Apr. 1986.

D.W. Novotny and T.A. Lipo, Vector Control and Dynamics of AC Drives, Oxform Science Publications, pp. 205–251.

DeDoncker et al, The Universal Field Oriented Controller, University of Wisconsin.

Lorenz et al, A control systems Perspective of field oriented Control for AC Servo Drives, University of Wisconsin.

Novotny and Lipo, WEMPEC, Wisconsin Electric Machines and Power Electronics Consortium, Tutorial Report, Chapter 4–1–4–73.

AUTOMATIC CALIBRATION OF CURRENT REGULATOR CONTROL COMPENSATION FOR AN ELEVATOR MOTOR DRIVE WITH LOCKED ROTOR

CROSS REFERENCES TO RELATED APPLICATIONS

Co-pending U.S. patent applications, Ser. Nos. (Otis Docket Nos. OT-3065, OT-3064, OT-3054, OT-4046, OT-4047), filed contemporaneously herewith, contain subject matter related to that disclosed herein.

TECHNICAL FIELD

This invention relates to automatic calibration of a motor/drive system and more particularly to automatic calibration of current regulator control compensation for an elevator motor drive.

BACKGROUND OF THE INVENTION

It is known in the art of motor drive circuits to use a current regulator (or current controller) to control motor current. It is also known to use proportional-plus-integral (P-I) closed loop control of motor current to provide synchronous control of motor currents. However, such current regulator must be accurately tuned to the electromagnetic dynamics of the motor to provide precise control of motor currents and, therefore, precise control of torque generated at the motor shaft. In particular, for a P-I controller, the proportional gain $K_P$ and the integral gain $K_I$ should be matched to the motor dynamics to provide optimal performance.

One technique to accurately determine such control parameters is to analyze the motor/drive system in an engineering laboratory using expensive test equipment and several engineering man-hours. However, in modernization or retrofit applications, where a new drive replaces an older drive in an existing elevator system, it is not convenient or cost effective to remove the motor from the elevator system for evaluation of the control parameters.

Another technique to determine the regulator control parameters involves dispatching a highly skilled engineer to the job site to tune the drive to the motor using special test equipment. However, such a technique is costly and time consuming and, as such, makes modernizing elevator motor drives unattractive for building owners.

Also, various techniques have been described for tuning current regulators, such as is described in: A. M. Khambadkone, et al, "Vector-controlled induction motor drive with self-commissioning scheme", IEEE Trans. Ind. Electronics, Vol. 38, No. 5, October 1991, pp. 322–327; H. Schierling, "Self-commissioning—a novel feature of modern inverter-fed induction motor drives", $3^{rd}$ Int'l Conference On Power Electronics and Variable Speed Drives, IEEE Conf. Pub. No. 291, pp. 287–290; M. Summer, et al, "Autocommissioning for voltage-referenced voltage-fed vector-controlled induction motor drives", IEEE Proceedings-B, Vol. 140, No. 3, May 1993; and T. Kudor, et al, "Self-Commissioning for vector-controlled induction motors", IEEE Pub. ID# 0-7803-x/93, pp. 528–535.

Such techniques attempt to measure the motor parameters and then calculate current regulator gains according to an algorithm based on those estimates. In particular, Khambadkone and Schierling teach applying voltage pulses to the motor, and use the rate of rise of current to estimate the motor transient inductance. Summer teaches applying a pseudo-random binary sequence of voltage pulses to the motor and uses a recursive least-squares calculation to estimate the motor parameters. The current regulator parameters are determined by a pole-placement algorithm using the estimated motor parameters. Kudor teaches applying a step input to the current regulator, and computes a performance index based on step response. Fuzzy logic rules are employed to adjust the regulator gains to achieve optimum tuning. However, the foregoing techniques are costly and complex to implement.

DISCLOSURE OF THE INVENTION

Objects of the invention include provision of automatic, on-site, calibration of control parameters for a current regulator for elevator motor drives, which does not require removal or uncoupling of the motor from the elevator system.

According to the present invention, a method for calculating a proportional gain, an integral gain of an integrator, and an overall gain for an elevator motor controller current regulator compensation, the controller and motor forming a current loop, including: a) minimizing the contribution of the integrator to the controller during steps (b)–(f); b) setting the proportional gain to an initial value; c) setting the overall gain based on a first test frequency; d) providing a sinusoidal current reference signal to the current regulator at the first test frequency; e) calculating an open loop gain of the current loop at the first test frequency; f) varying the proportional gain and performing steps (e) until the open loop gain is within a predetermined tolerance of 1; g) providing the sinusoidal current reference signal to the current regulator at a second test frequency; h) calculating a closed loop gain of the current loop at the second test frequency; and i) varying the integral gain and performing step (h) until the closed loop gain is within a predetermined tolerance of 1.

The invention represents a significant improvement over the prior art by allowing the current regulator control parameters ($K_I$, $K_P$, Gc) to be automatically determined at the job site. The invention does not require removing the motor from the job site or uncoupling the motor from the elevator system. Also, the invention does not require a specially trained engineer with special test equipment to tune the motor/drive system. Thus, the invention greatly reduces cost associated with tuning the current regulator when new motors drives are retrofit into job sites. Accordingly, automatic fine-tuning of the control parameters at the field site saves both time and money. As a result, the present invention makes it more attractive for building owners to upgrade their elevator systems to modern controls, which are currently economically impractical due to the high cost of determining parameters of older motors found in modernization job sites. Still further, the present invention allows existing elevator motion control and safety systems to remain in place throughout the calibration procedure of the present invention.

The foregoing and other objects, features and advantages of the present invention will become more apparent in light of the following detailed description of the exemplary embodiments thereof, as illustrated in the accompanying drawings.

BEST MODE FOR CARRYING OUT THE INVENTION

Figure 1:
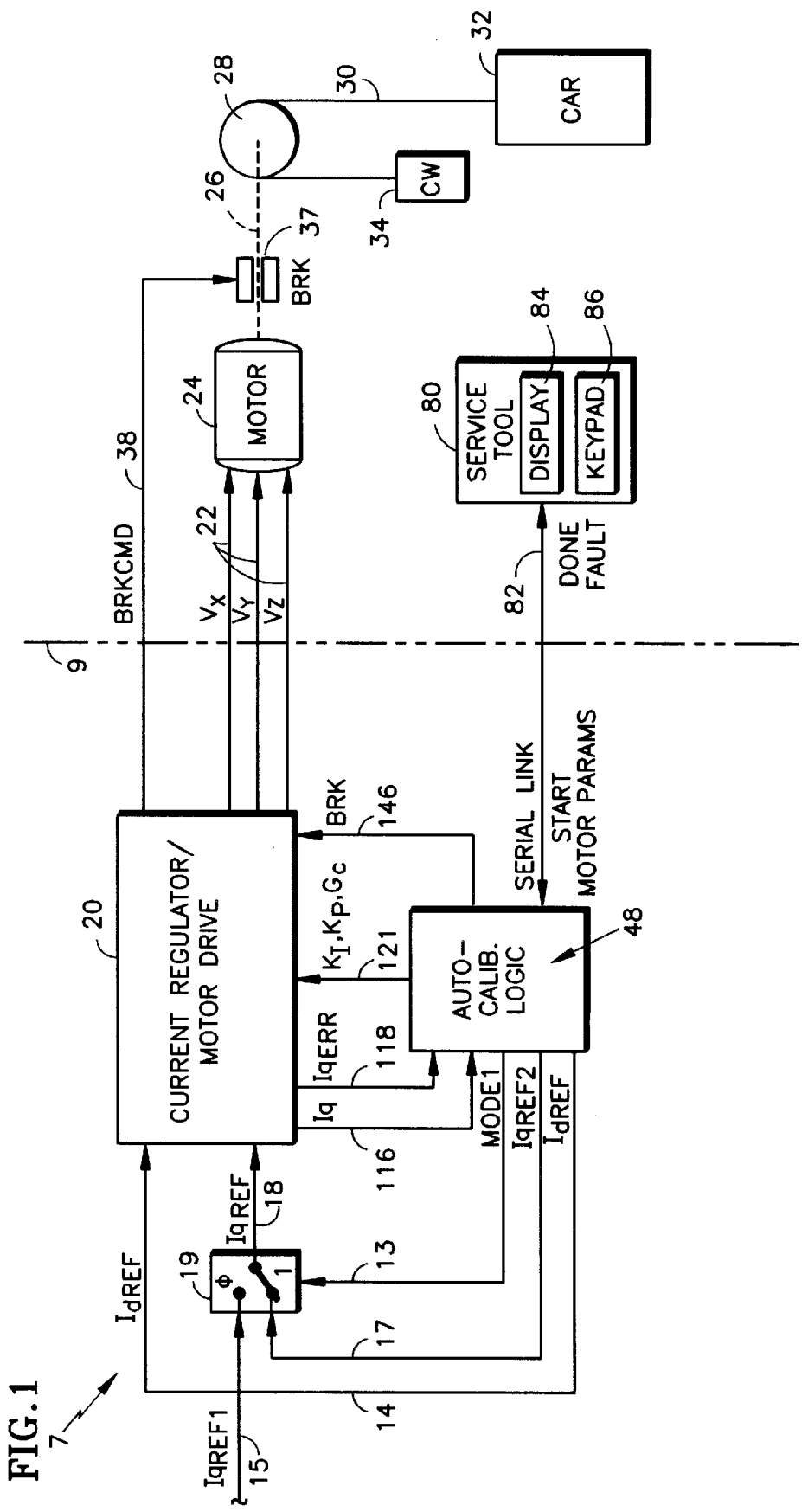
FIG. 1 is a schematic block diagram of a portion of an elevator motor controller including a current regulator/motor drive having auto-calibration logic, in accordance with the present invention.

Referring to FIG. 1, a portion of an elevator motor controller 7 shown to the left of the line 9, includes a field-oriented (or vector-based) motor control that has two control loops each corresponding to a different control axis, a d-axis relating to motor magnetization, and a q-axis relating to torque. The d-axis loop has a d-axis current reference input signal $I_{dREF}$ provided on a line 14. $I_{dREF}$ is set to a predetermined constant value so as to provide appropriate magnetic flux in the motor based on motor magnetization curves, e.g., $I_{dRATED}$ or $I_{NO-LOAD}$, discussed more hereinafter. The $I_{dREF}$ signal is fed to a field-oriented current regulator/motor drive circuit 20, described more hereinafter with FIG. 2.

The q-axis current loop has a first q-axis current reference input signal $I_{qREF1}$ on a line 15 is fed to one input of a switch 19. $I_{qREF1}$ is provided by other logic (not shown), such as speed loop compensation logic (not shown), which closes a motor speed control loop, such as that described in Copending U.S. patent application, Ser. No. (Otis Docket No. OT-3054), which provides the q-axis current reference signal to the controller when it is not in auto-calibration.

The other input to the switch 19 is a second q-axis current reference input signal $I_{qREF2}$ on a line 17. The output of the switch 19 is the q-axis current loop reference signal $I_{qREF}$ on a line 18, which is set equal to $I_{qREF1}$ or $I_{qREF2}$ based on the state of the MODE1 signal provided to the switch 19 on the line 13. The $I_{qREF}$ signal is fed to the field-oriented current regulator/motor drive circuit 20, described more hereinafter with FIG. 2.

Two examples of three phase AC induction motors used with the present invention are, Model LUGA-225LB-04A, by Loher, having a rated power of 45 KW, rated voltage of 355 volts, rated speed of 1480, and rated frequency of 50 Hz, in a geared configuration; and Model 156MST, by Tatung (of Taiwan), having a rated power of 40 KW, rated voltage of 500 volts, rated speed of 251, and rated frequency of 16.7 Hz, in a gearless configuration. Other motors having other rated parameters may be used if desired.

The circuit 20 provides three phase voltage signals Vx, Vy, Vz on lines 22 to a motor 24, e.g., a three phase induction motor. The motor 24 is connected by a mechanical linkage 26, e.g, a shaft and/or a gearbox, to a sheave 28. A rope or cable 30 is wrapped around the sheave 28 and has one end connected to an elevator car 32 and the other end connected to a counterweight 34. The weight of the counterweight is typically equal to the weight of an empty car plus 40–50% of the max load in the car.

Other elevator system configurations, and with or without a counterweight, with or without a gearbox, may be used if desired to convert the output torque of the motor 24 to movement of the elevator cab 32, such as dual lift (where two elevator cars are connected to a single rope, the cars move in opposite directions and each car provides a counterweight for the other car), drum machine (where the rope is wrapped around a drum driven by a motor), etc.

A brake 37, e.g., an electromagnetic actuated disk brake, is disposed on the shaft 26, and is driven by an electrical brake command signal BRKCMD on a line 38 from the circuit 20. The brake 37, when activated or "dropped", clamps onto the shaft 26 and prevents the motor shaft 26 from turning, i.e., locks the rotor, and thus prevents the sheave 28 from moving.

Figure 2:
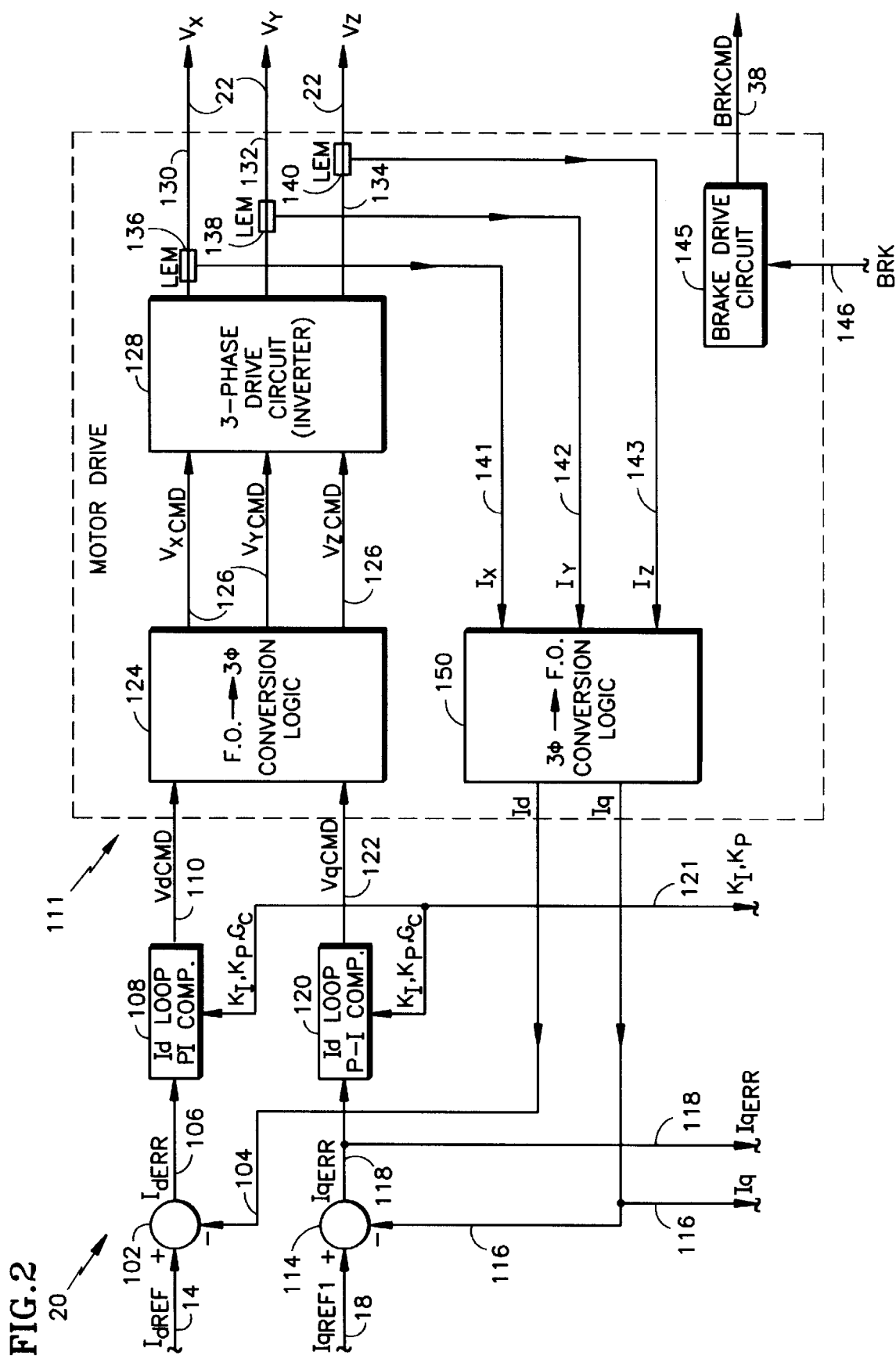
FIG. 2 is a schematic block diagram of the current regulator/motor drive of FIG. 1, in accordance with the present invention.

Referring to FIG. 2, it is known in the art of field-oriented motor control that such control uses current (Id,Iq) and voltage (Vd,Vq) parameters corresponding to the d and q axes, respectively. Using field orientation, the motor magnetic field (or flux) will be controlled by Id and the motor torque will be controlled by Iq, as is known. In particular, the field-oriented current regulator/motor drive 20 of FIG. 1 comprises two current control loops, one for the d-axis current Id and one for q-axis current Iq. The Id loop receives the $I_{dREF}$ signal on the line 14 to a positive input to a summer 102. A measured or feedback d-axis current signal Id on a line 104 is fed to a negative input to the summer 102. The output of the summer 102 is an error signal $I_{dERR}$ on a line 106 which is fed to control compensation logic 108, such as proportional-plus-integral (P-I) current loop control, having a proportional gain $K_P$, an integral gain $K_I$, and an overall gain Gc, provided on lines 121, as described more hereinafter. The logic 108 provides a d-axis voltage command signal $V_{dCMD}$ on a line 110.

For the q-axis, the Iq loop receives the $I_{qREF}$ signal on the line 18 to a positive input to a summer 114. A measured or feedback q-axis current signal Iq on a line 116 is fed to a negative input to the summer 114. The output of the summer 114 is an error signal $I_{qERR}$ on a line 118 which is fed to control compensation logic 120, e.g., proportional-plus-integral (P-I) logic similar to the logic 108, having the proportional gain $K_P$, the integral gain $K_I$, and the overall gain Gc, the same as the gains for logic 108. The output of the logic 120 is a q-axis voltage command signal $V_{qCMD}$ on a line 122.

The voltage commands $V_{dCMD}$ and $V_{qCMD}$ are fed to known field-oriented to three-phase conversion logic 124 which converts the d-axis and q-axis voltage commands to three phase voltage commands $V_{XCMD}$, $V_{YCMD}$, $V_{ZCMD}$ on lines 126. The phase voltage commands $V_{XCMD}$, $V_{YCMD}$, $V_{ZCMD}$ are fed to a known three phase drive circuit (or inverter) 128 which provides three phase voltages $V_X$, $V_Y$, $V_Z$ on lines 130, 132, 134, respectively (collectively, the lines 22), to drive the motor 24 (FIG. 1).

Within the drive circuit 128 (details not shown), each of the voltage commands $V_{XCMD}$, $V_{YCMD}$, $V_{ZCMD}$ on lines 126 are converted to percent duty cycle commands indicative of the corresponding input voltage level. The percent duty cycle is converted into a pulse-width-modulated drive signal which drives power transistors to provide the pulse-width-modulated, variable frequency, three phase voltages $V_X$, $V_Y$, $V_Z$ on lines 130, 132, 134, respectively. The conversions within the drive 128 are performed using electronic components and/or software well known in the art of motor drive circuits. Any other type of drive circuit that receives input voltage commands and provides output phase voltages may be used, and the phase voltages need not be pulse-width modulated.

Phase currents $I_X$, $I_Y$, $I_Z$ associated with the voltages $V_X$, $V_Y$, $V_Z$, respectively, measured by known current sensors 136, 138, 140, e.g., closed-loop Hall-effect current sensors (such as LEMS), respectively, and are provided on lines 141, 142, 143, respectively. The phase currents $I_X$, $I_Y$, $I_Z$ are fed to known three phase to field-oriented conversion logic 150, which provides a known conversion from phase currents to d axis and q axis currents Id, Iq, on the lines 104,116 which are fed to the summers 102,114, respectively, as feedback currents.

The converters 124,150 provide known conversions between vector (d and q axis) parameters and per-phase parameters, such as that described in D. Novotny, et al, "Vector Control and Dynamics of AC Drives", Oxford University Press, 1996, Ch 5, pp 203–251. The converters 124,150 may likely implement such conversions in software using a microprocessor or the like.

The motor drive logic 111 also includes a brake drive circuit 145 which receives an input signal BRK on a line 146 and provides a BRKCMD signal on the line 38.

Referring to FIG. 1, the present invention comprises auto-calibration logic 48 which automatically computes the control parameters $K_I$, $K_P$, Gc and provides them on the lines 121 to the circuit 20. The logic 48 receives $I_{qERR}$ and Iq from the circuit 20. The logic 48 also provides the current reference signals $I_{qREF2}$ to the switch 19 and $I_{dREF}$ to the circuit 20 on the line 14. The logic 48 also provides the MODE1 signal on the line 13 to the switch 19. The MODE1 flag causes the current reference signal $I_{qREF2}$ from the calibration logic 48 to be fed to the logic 20. The logic 48 also provides a break request signal BRK on the line 146 to the circuit 20.

The calculation logic 48 also communicates with a service tool 80 over a serial link 82. The service tool 80 includes a display 84 and a keypad (or keyboard) 86 for entering data into the service tool 80 and over the link 82 to the controller 7. In particular, the logic 48 receives a Start command and a Stop command over the link 82 from the service tool 80, which controls when auto-calibration is started and stopped (or aborted), respectively. The logic 66 also provides a DONE signal and a FAULT signal to the service tool 80 over the link 82. The DONE signal indicates when auto-calibration has completed without any faults and the FAULT signal indicates when a fault has been detected during auto-calibration.

The logic 48 comprises known electronic components, which may include a microprocessor, interface circuitry, memory, software, and/or firmware, capable of performing the functions described herein.

Figure 3:
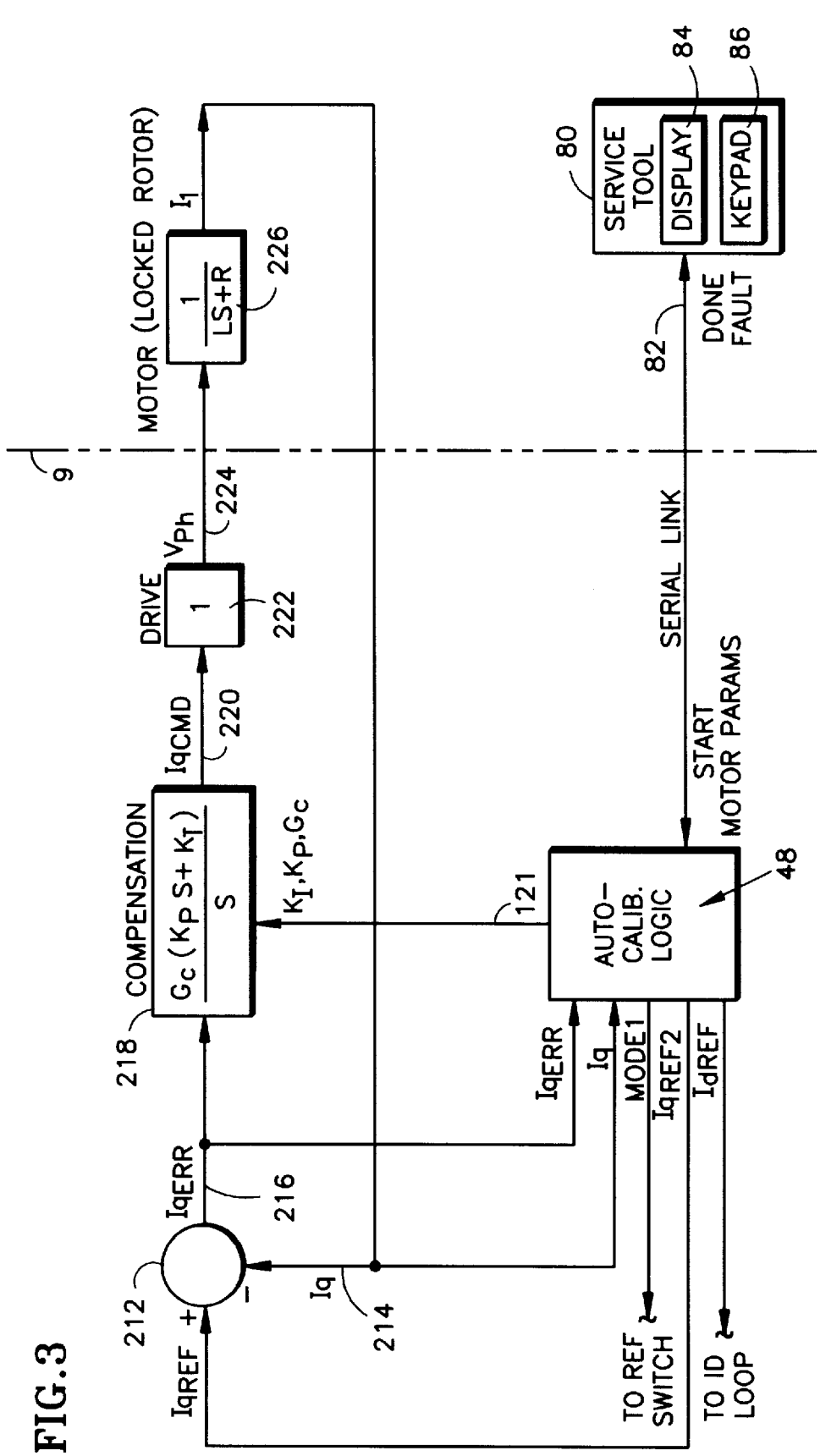
FIG. 3 is a control system block diagram of system of FIG. 1, in accordance with the present invention.

Referring to FIG. 3, a control system block diagram equivalent diagram of the q-axis current loop with the auto-calibration logic 48 of FIGS. 1 and 2 is shown when the MODE1 signal (FIG. 1) commands the switch 19 to set $I_{qREF}$ equal to $I_{qREF2}$ as the reference to the q-axis current loop (i.e., auto-calibration mode). Various portions of the control system of FIG. 3 may be analogized to the portions of the schematic block diagrams of FIGS. 1 and 2. In particular, the control system of FIG. 3 comprises the q-axis current reference signal $I_{qREF}$ on a line 210 (analogous to the line 18 of FIG. 2) from the auto-calibration logic 48, which is fed to the positive input of a summer 212 (analogous to the summer 114 of FIG. 2). The Iq current feedback signal on a line 214 is fed to the negative input of the summer 212. The summer 212 provides an error signal $I_{ERR}$ on a line 216 to a box 218 which represents the P-I control compensation (analogous to the q-axis loop compensation logic 120 in FIG. 2). The compensation 218 comprises a known proportional-plus-integral (P-I) control transfer function:

$$Gc(K_P + K_I/s) \qquad \text{Eq. 1}$$

where $K_I$ is the integral gain, $K_P$ is the proportional gain, Gc is the overall gain, and "s" is the known Laplace transform operator.

The compensation 218 provides a voltage command signal $V_{qCMD}$ on a line 220 to a box 222 indicative of the transfer function of the motor drive 111 (FIG. 2) which, in the frequency range of interest, has a transfer function of 1. The drive 222 provides a per-phase drive voltage Vph on a line 224 to a box 226 representing the transfer function of the motor 24 (FIG. 1). The transfer function of the motor 24 is approximated by a first order lag having an equation:

$$1/(Ls+R) \qquad \text{Eq. 2}$$

where L is the per-phase inductance of the motor, R is the per-phase resistance of the motor, and "s" is the Laplace transform operator. The motor 24 is a three-phase induction motor but may be any type of motor having a similar transfer function. The q-axis current Iq of the motor is indicated on a line 214 and is fed back to the summer 212. Iq is actually measured within the drive 111 (FIG. 2); however, the transfer function of the motor is part of the control system loop dynamics as shown in FIG. 3.

As discussed hereinbefore with FIGS. 1 and 2, the auto-calibration logic 48 provides $I_{qREF2}$ to the q-axis current loop on the line 210 (as well as the MODE1 and the $I_{dREF}$ signals, destination not shown in FIG. 3), which in this case, is equal to the q-axis current loop reference $I_{qREF}$, receives the signals $I_{qERR}$, Iq on lines 216,214, respectively, (analogous to the lines 118,116 of FIG. 2) from the q-axis current loop, provides the control parameters $K_I$, $K_P$, Gc on lines 219 (analogous to lines 121 of FIG. 2) to the compensation 218, and receives and provides parameters over the serial link 82.

Figure 4:
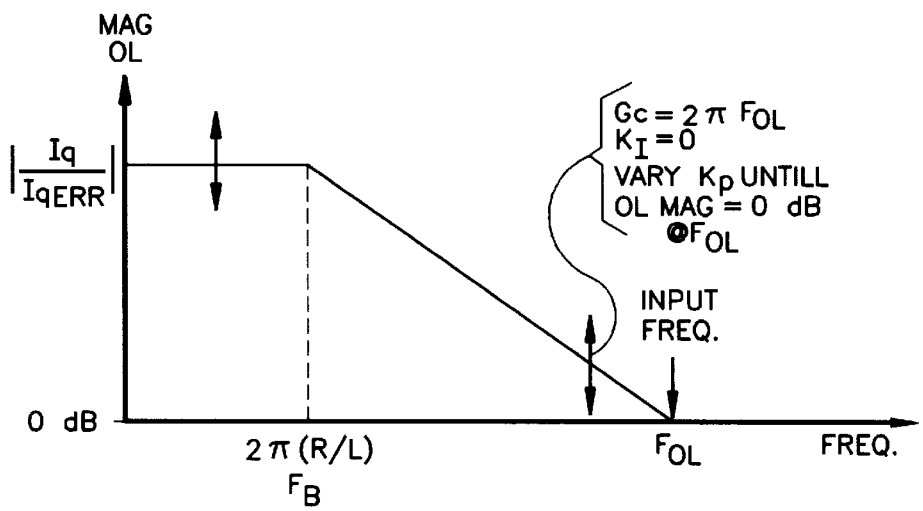
FIG. 4 is a plot of the magnitude frequency response of the open loop transfer function of the control system of FIG. 3, in accordance with the present invention.
Figure 5:
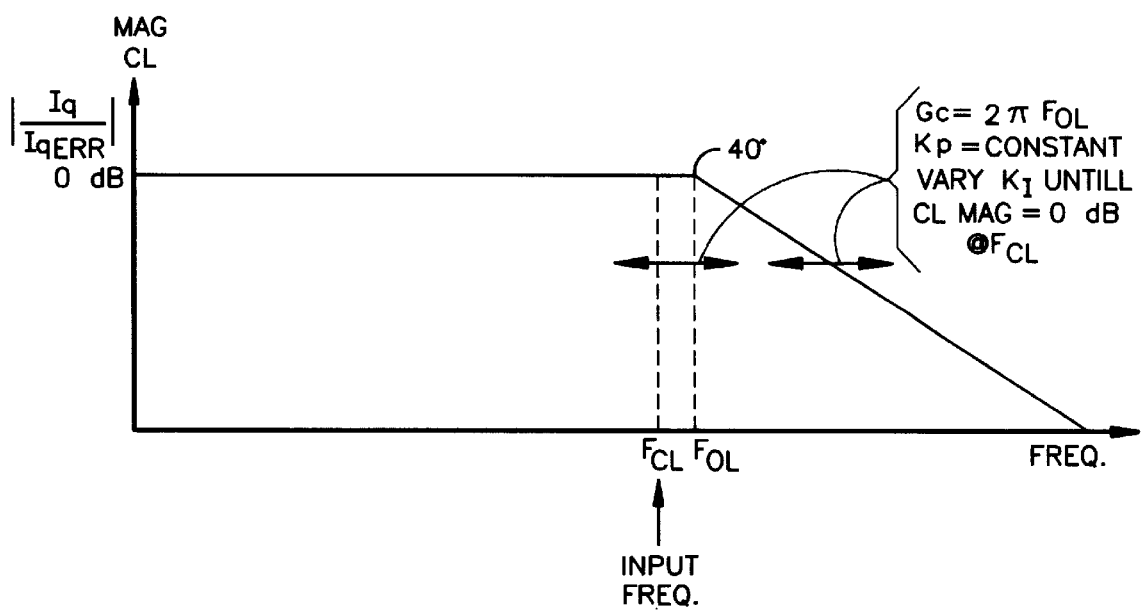
FIG. 5 is a plot of the magnitude frequency response of the closed loop transfer function of the control system of FIG. 3, in accordance with the present invention.

Referring to FIGS. 3, 4, and 5, the auto-calibration logic 48 sets Gc and adjusts $K_I$ and $K_P$ to obtain the desired overall drive/motor loop response without disconnecting or removing the motor. In particular, the open loop transfer function for the control system block diagram combines Eqs. 1 and 2 as follows:

$$\frac{Gc(K_P s + K_I)}{s} \times \frac{1}{Ls + R} \qquad \text{Eq. 3}$$

If $K_P = L$ and $K_I = R$, the open loop transfer function of Eq. 3 reduces to Gc/s, an integrator with a gain Gc, which provides desirable loop performance of the motor control system. The resultant integrator has a magnitude (or gain) frequency response which crosses 1 (0 dB) at $\omega_C$(rad/sec)=Gc (i.e., the open loop cross-over frequency). Thus, the integrator gain Gc is set to equal the desired open loop cross-over frequency in rad/sec (i.e., Gc=$\omega_C$=$2\pi F_{OL}$). For a system with an open loop transfer function equal to an integrator, the frequency at which the open loop gain crosses through 1 (0 dB), i.e., the open loop cross-over frequency ($F_{OL}$), is equal to the frequency at which the closed loop response is less than 1 (0 dB) by a predetermined amount (e.g., 3 dB), i.e., the closed loop bandwidth.

The auto-calibration logic 48 receives the value of Gc and/or $F_{OL}$ over the link 82 from the service tool 80 (computes Gc or $F_{OL}$) and provides Gc to the circuit 20. The logic 48 also determines the value of $K_I$ and $K_P$ using a two-step process (discussed in more detail hereinafter with FIG. 6). First, the proportional gain $K_P$ is varied (or tuned)

with the integral gain $K_I=0$ (or close to zero). The purpose of setting $K_I=0$ (or close to zero) is to eliminate or minimize the integrator portion of the compensation 108,120 from contributing to the system response during this first step of the process. Other techniques may be used if desired to minimize integrator contribution, such as temporarily disabling the integrator, switching the integrator out of the system, or holding the output of the integrator to zero.

A sinusoidal input signal is then provided as the reference current $I_{qREF}$ to the loop, where the input signal has a frequency $F_{OL}$ equal to the desired open loop cross-over frequency. The open loop magnitude is calculated by calculating the ratio of the signals $Iq/I_{qERR}$. Kp is varied until the magnitude of the open loop gain is within a predetermined tolerance of 1 (0 dB).

Referring to FIGS. 4 and 5, if the break frequency $F_B$ is sufficiently small compared to the open loop crossover frequency $F_{OL}$, the open loop response at the open loop crossover frequency resembles that of an integrator. Accordingly, the closed loop bandwidth (indicated by a point 400), i.e., the frequency at which the closed loop frequency response or gain begins to drop off or attenuate, will be substantially equal to the open loop crossover frequency $F_{OL}$.

Second, the integral gain $K_I$ is tuned with $K_P$ set to the value determined from the aforementioned first step. In that case, a sinusoidal input is provided as the reference current $I_{qREF}$ to the loop, where the input signal has a frequency $F_{CL}=0.8\ F_{OL}$, the desired closed loop bandwidth of the loop. Multipliers other than 0.8 may be used if desired based on the desired system response. $K_I$ is varied until the magnitude of the closed loop transfer function is within a predetermined tolerance of 1 (0 dB).

Figure 6:
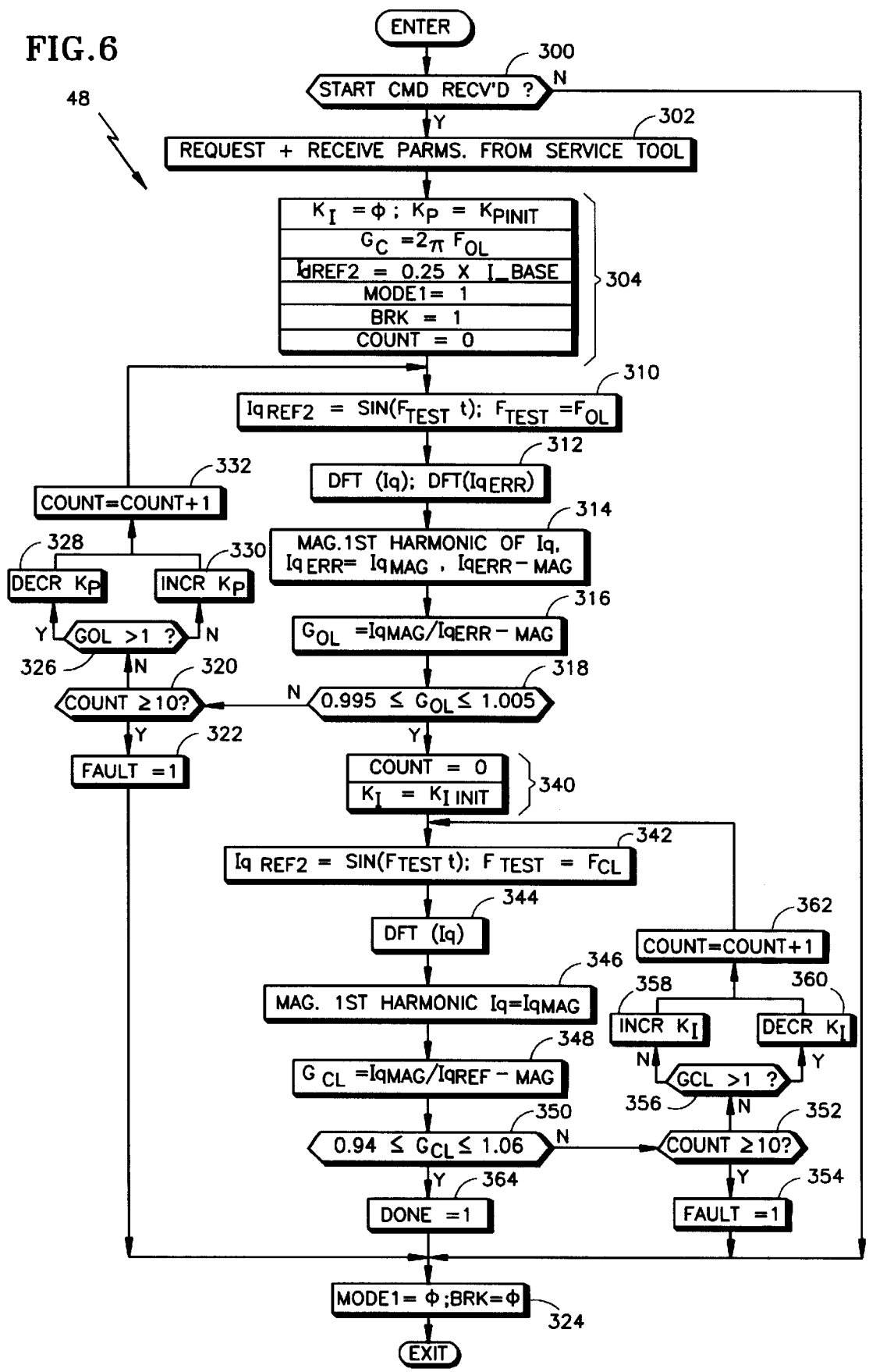
FIG. 6 is a logic flow diagram of the auto-calibration logic of FIG. 1, in accordance with the present invention.

Referring to FIG. 6, more specifically, a top-level flow diagram for the auto-calibration logic 48 begins at a step 300, which checks whether a start command has been received from the service tool 80 (FIG. 1). If a start command has not been received, the logic 48 exits. If a start command has been received, a step 302 requests and receives the necessary parameters to perform auto-calibration, discussed hereinafter.

Next, a series of steps 304 sets $K_I=0$, $K_P=K_{P-INIT}$, $Gc=2\pi F_{OL}$ and the value for $I_{dREF}$, as described below. Also, the steps 304 set a variable COUNT=0, set MODE1=1, and set BRK=1, which engages the brake 37 (FIG. 1) and locks the rotor.

The value of $K_{P-INIT}$ is calculated using information from the motor nameplate and/or motor data sheet. As discussed hereinbefore, it is desired for $K_P$ to be equal to the motor inductance L. As an initial value, $K_{P-INIT}$ is set based on an approximation of the motor transient inductance $L\sigma$, which is approximated based on a "base" inductance (L_BASE) of the motor, using the below equation:

$$K_{P-INIT}=0.1\times L\_BASE$$

L_BASE comprises both the magnetizing inductance ($L_m$) and the transient inductance ($L\sigma$), and $L\sigma$ is about 10–20% of $L_m$. Multipliers other than 0.1 may be used if desired. L_BASE is calculated from the motor nameplate data using the below equations:

$$Z\_BASE=(PWR\_RATED)/(VLL\_RATED)^2$$

$$L\_BASE=Z\_BASE/(2\pi HZ\_RATED)$$

where PWR_RATED is the rated motor shaft power in watts; RPM_RATED is the rated motor speed in RPM; VLL_RATED is the rated RMS line-to-line voltage in volts; and HZ_RATED is the rated frequency in hertz.

The value of $I_{dREF}$ is set as follows:

$$I_{dREF}=0.25\times I\_BASE$$

where I_BASE is the motor "base" current calculated from nameplate data as $(PWR\_RATED)/((3)^{1/2}\times VLL\_RATED)$. Other settings may be used for $I_{dREF}$ if desired, provided the appropriate amount of flux is generated in the motor.

The values of $K_{P-INIT}$ and $I_{dREF}$ may be calculated by the logic 48 using the nameplate parameters PWR_RATED, RPM_RATED, VLL_RATED, and HZ_RATED, entered into the service tool 80 by service personnel and sent over the link 82 to the logic 48. Alternatively, the values of $K_{P-INIT}$ and $I_{dREF}$ may be calculated by service personnel and entered into the service tool 80 and sent over the link 82 to the logic 48.

Next, a step 310 sets $I_{qREF2}$ equal to a sinewave having a test frequency of $F_{OL}$ equal to the desired open loop crossover frequency, e.g., 180 to 333 Hz. Other frequencies may be used if desired. The sinusoid is generated digitally by a signal processor, such as a digital signal processor, e.g., Motorola DSP 56002 processor, with an update (or sample) rate of 5 KHz. Other hardware and/or software techniques and update rates may be used to generate the sinusoidal input signals.

Next a step 312 monitors the signals $I_{qERR}$ and $I^q$ on the lines 118, 116, respectively, and uses the aforementioned digital signal processor to perform a Discrete Fourier Transform (DFT) of the individual signals $I_{qERR}$ and $I_q$ to obtain the magnitude of the fundamental or first harmonic of the $I_{qERR}$ and $I_q$ signals ($I_{qMAG}$, $I_{qERR-MAG}$) to calculate the open loop gain. The first harmonic is used to calculate the open loop gain so that non-linearities in the control system do not distort the calculation. The fundamental or first harmonic component of a measured signal from a DFT, as is known, is $A\sin(\omega t)+B\cos(\omega t)$ where $\omega$ is the test frequency ($2\pi F_{OL}$). Next a step 314 calculates the magnitude of the first harmonic by the known equation: $(A^2+B^2)^{1/2}$.

To compute a DFT, as is known, standard sine and cosine waves of unit amplitude at the test frequency are generated within the logic 48. The measured signal ($I_{qERR}$, $I_q$) is multiplied by the standard sinewave and the product is integrated over one period of the excitation to yield the Fourier series coefficient A of the signal. Multiplying the signal by the standard cosine and integrating yields the B coefficient. We have found that integrating over 15 periods of the input signal it is sufficient to filter out any transients in the system response. This also applies to the DFT performed for the closed loop gain, discussed hereinafter. Other numbers of periods may be used if desired. Also, other types of Fourier transforms may be used if desired, e.g., a Fast Fourier Transform (FFT), etc., provided the first harmonic of the desired signal is obtained. Further, instead of a Fourier transform, any other filtering or spectrum analysis technique may be used for determining the first harmonic of the desired signals.

Next, a step 316 calculates the open loop gain $G_{OL}$ as the ratio of the magnitude of the current feedback signal $I_{qMAG}$ to the magnitude of the current loop error $I_{qERR-MAG}$.

Next, a step 318 checks whether $G_{OL}$ is within +/-0.5% of 1 (i.e., +/-0.005). Other tolerances may be used. If not, a step 320 tests whether COUNT is greater than or equal to ten, i.e., whether the loop has iterated at least ten times. If it has iterated ten times, a step 322 sets FAULT=1 which is sent to the service tool 80 (FIG. 3) over the serial link 82 and a step 324 sets MODE1=0, BRK=0, and the logic exits. If the logic has iterated less than ten times, a step 326 checks if $G_{OL}$ is greater than one. If $G_{OL}$ is greater than one, $K_P$ is decremented by a predetermined amount at a step 328. If $G_{OL}$ is less than one, $K_P$ is incremented by a predetermined amount at a step 330. In either case, next a step 332 increments the counter COUNT by one and the logic goes to the step 310 to recalculate $G_{OL}$ with a new value of $K_P$.

One way to iterate $K_P$ is to use a binary search technique where the value of $K_P$ is determined by setting it equal to the average of an upper and lower bound after each test. The upper or lower bound is adjusted to reduce the search interval by a factor of two each time until the desired threshold is obtained. For example, the upper bound Kp-upper=$3K_{P\text{-}INIT}$ and the lower bound Kp-lower=0, and Kp=(Kp-upper+Kp-lower)/2. If Kp is to be increased (step 330), the lower bound is increased to Kp-lower=Kp, and if Kp is to be decreased (step 328), the upper bound is decreased to Kp-upper=Kp. Then, the next value of Kp is calculated based on the modified upper or lower bounds.

Alternatively, KP may be changed by a small amount e.g., 1%, each iteration until the desired tolerance is reached. Any other search techniques that converges within the desired time may be used if desired.

If the value of GOL is within the desired predetermined tolerance in the step 318, the integral gain $K_I$ is then determined based on the desired closed loop frequency response to a sinusoidal input frequency. In particular, a series of steps 340 sets COUNT=0 and KI=KI-INIT.

To determine the value for $K_I$, the value for $K_P$ is set to the value determined in the aforementioned first step in the process and $K_I$ is set to an initial value $K_{I\text{-}INIT}$. Because it is desired for $K_I$ to be equal to the motor resistance R, the value for $K_{I\text{-}INIT}$ is set to an estimated value for R of:

$$K_{I\text{-}INIT}=1000 \times K_P$$

Multipliers other than 1000 may be used to estimate $K_{I\text{-}INIT}$.

Next, a step 342 sets $I_{qREF2}$ equal to a sinewave having a test frequency of $F_{CL}=0.8 \times F_{OL}$ equal to the desired closed loop bandwidth and $I_{dREF}$ is still set as before. The sinusoid is generated as described hereinbefore with the open loop test of step 310.

Next a step 344 monitors the feedback current signal Iq on the lines 116 and computes the discrete Fourier transform (DFT) of the signal Iq to obtain the magnitude of the fundamental or first harmonic of the Iq signal ($I_{qMAG}$) used to calculate the closed loop gain so that non-linearities in the control system do not distort the calculation, in a similar fashion to that done for the open loop gain discussed hereinbefore. The fundamental or first harmonic component of a measured signal from a DFT, as is known, is $x=A \sin(\omega t)+B \cos(\omega t)$ where $\omega$ is the test frequency ($2\pi F_{CL}$). Next, a step 346 calculates the magnitude of the first harmonic by the known equation: $(A^2+B^2)^{1/2}$. The number of integration periods for the DFT are the same as that discussed hereinbefore.

Next, a step 348 calculates the closed loop gain $G_{CL}$ as the ratio of the magnitude of the current feedback signal $I_{qMAG}$ to the magnitude of the input current loop reference signal $I_{qMAG}$ (which was provided by the logic 48, and thus need not be measured)

Next, a step 350 checks whether $G_{OL}$ is within +/-6% of 1. Other tolerances may be used. If not, a step 352 tests whether COUNT is greater than or equal to ten, i.e., whether the loop has iterated at least ten times. If it has iterated ten times, a step 354 sets FAULT=1 which is sent to the service tool 80 (FIG. 3) over the serial link 82 and a step 324 sets MODE1=0, BRK=0, and the logic exits. If the logic has iterated less than ten times, a step 356 checks if $G_{CL}$ is greater than one. If $G_{CL}$ is greater than one, $K_I$ is decremented by a predetermined amount at a step 360. If $G_{CL}$ is less than one, $K_I$ is incremented by a predetermined amount at a step 358. In either case, next a step 362 increments the counter COUNT by one and the logic goes to the step 342 to recalculate $G_{CL}$ with a new value of $K_I$.

One way to iterate $K_I$ is to use a binary search technique similar to that discussed regarding the iteration of $K_P$ hereinbefore, where the value of $K_I$ is determined by setting it equal to the average of an upper and lower bound after each test. The upper or lower bound is adjusted to reduce the search interval by a factor of two each time until the desired threshold is obtained. For example, the upper bound $K_I$-upper=$2K_{I\text{-}INIT}$ and the lower bound $K_I$-lower=0, and $K_I$=($K_I$-upper+$K_I$-lower)/2. If $K_I$ is to be increased (step 358), the lower bound is increased to $K_I$-lower=$K_I$, and if $K_I$ is to be decreased (step 360), the upper bound is decreased to KI-upper=$K_I$. Then, the next value of $K_I$ is calculated based on the modified upper or lower bounds.

Alternatively, $K_I$ may be changed by a small amount e.g., 1%, each iteration until the desired tolerance is reached. Any other search or iteration techniques that converges within the desired time may be used if desired.

We have found that the binary search discussed hereinbefore for $K_P$ and $K_I$ will converge within about eight iterations which is sufficiently accurate; however, more or less iterations may be used if desired.

If $G_{CL}$ is within the desired tolerances in step 350, then a step 364 sets the DONE flag equal to 1 which is transmitted via the serial link 82 to the service tool 80, a step 324 sets MODE1=0, BRK=0, and the logic exits.

Other closed loop bandwidths and open loop cross-over frequencies and other input frequencies may be used if desired, e.g., the input frequency may be equal to $F_{OL}$ for both calculations if desired.

Even though the invention has been described using the field-oriented drive 20, the invention will work equally well with any type or drive and need not be a field-oriented drive, provided the reference current, current error, and feedback current are read by the logic 48.

Although the invention has been described and illustrated with respect to exemplary embodiments thereof, it should be understood by those skilled in the art that the foregoing, and various other changes, omissions and additions may be made without departing from the spirit and scope of the present invention.

What is claimed is:

1. A method for calculating a proportional gain, an integral gain of an integrator, and an overall gain for an elevator motor controller current regulator compensation, the controller and motor forming a current loop, comprising the steps of:

a) minimizing the contribution of the integrator to the controller during steps (b)–(f);

b) setting the proportional gain to an initial value;

c) setting the overall gain based on a first test frequency;

d) providing a sinusoidal current reference signal to the current regulator at said first test frequency;

e) calculating an open loop gain of the current loop at said first test frequency;

f) varying said proportional gain and performing steps (e) until said open loop gain is within a predetermined tolerance of 1;

g) providing said sinusoidal current reference signal to the current regulator at a second test frequency;

h) calculating a closed loop gain of the current loop at said second test frequency; and i) varying said integral gain and performing step (h) until said closed loop gain is within a predetermined tolerance of 1.

2. The method of claim 1, wherein said step of calculating the open loop gain of the current loop at said first test frequency comprises computing the ratio of a first harmonic of a current feedback signal to a first harmonic of a current error signal.

3. The method of claim 2, wherein said step of computing the ratio, comprises:

computing a Fourier transform of said current error signal; and computing a Fourier transform of said current feedback signal.

4. The method of claim 1, wherein said step of calculating the closed loop gain of the current loop at said second test frequency comprises computing the ratio of a first harmonic of a current feedback signal to a first harmonic of a current reference signal.

5. The method of claim 4, wherein the first harmonic is computed comprising:

computing a Fourier transform of said current reference signal; and computing a Fourier transform of said current feedback signal.

6. The method of claim 1, wherein said initial value of said proportional gain is $0.2 \times L\_BASE$, where $L\_BASE$ is calculated using the below equations:

$$Z\_BASE = (PWR\_RATED)/(VLL\_RATED)^2$$

$$L\_BASE = Z\_BASE/(2\pi HZ\_RATED)$$

where PWR_RATED is the rated motor shaft power in watts;

RPM_RATED is the rated motor speed in RPM;

VLL_RATED is the rated RMS line-to-line voltage in volts; and

HZ_RATED is the rated frequency in hertz.

7. The method of claim 1, wherein the motor is a three phase induction motor.

8. The method of claim 1, wherein the motor controller is a field-oriented controller.

9. The method of claim 1, wherein said steps (a)–(h) are performed automatically upon receiving a command from a service tool.

10. The method of claim 1, wherein said first test frequency is the desired open loop cross-over frequency and said second test frequency is the desired closed loop bandwidth.

* * * * *